United States Patent [19]

Kikuya et al.

[11] Patent Number: 5,130,869
[45] Date of Patent: Jul. 14, 1992

[54] RECORDING AND/OR REPRODUCING APPARATUS INCLUDING A CARTRIDGE LOADING DEVICE

[75] Inventors: Satoshi Kikuya; Yoshikazu Gotoh, both of Hirakata; Makoto Fujita, Ikoma, all of Japan

[73] Assignee: Matsushita Electric Industrial Co., Ltd., Osaka, Japan

[21] Appl. No.: 777,502

[22] Filed: Oct. 17, 1991

Related U.S. Application Data

[63] Continuation of Ser. No. 378,616, Jul. 12, 1989, abandoned.

[30] Foreign Application Priority Data

Jul. 13, 1988 [JP] Japan ................................ 63-174530
Jul. 13, 1988 [JP] Japan ................................ 63-174533

[51] Int. Cl.$^5$ ...................... G11B 17/04; G11B 5/016; G11B 33/02
[52] U.S. Cl. .............................. 360/99.06; 360/99.02; 369/77.2
[58] Field of Search ............... 360/99.02, 99.03, 99.06, 360/99.07; 369/77.1, 77.2

[56] References Cited

U.S. PATENT DOCUMENTS

| | | | |
|---|---|---|---|
| 4,570,194 | 2/1986 | Schatteman | 360/99.06 |
| 4,651,246 | 3/1987 | Becker | 360/99.02 |
| 4,669,009 | 5/1987 | Naoi et al. | 360/99.02 |
| 4,675,762 | 6/1987 | Noda et al. | 360/99.02 |
| 4,700,338 | 10/1987 | Sugihara et al. | 369/77.1 |
| 4,740,937 | 4/1988 | Watanabe | 360/99.06 |
| 4,878,138 | 10/1989 | Ando et al. | 360/99.02 |
| 4,899,238 | 2/1990 | Inoue et al. | 360/99.06 |
| 4,993,009 | 2/1991 | Shiho | 360/99.02 |

FOREIGN PATENT DOCUMENTS

| | | |
|---|---|---|
| 0144068 | 6/1985 | European Pat. Off. . |
| 3433344 | 3/1985 | Fed. Rep. of Germany . |
| 3542343 | 6/1986 | Fed. Rep. of Germany . |
| 60-251541 | 12/1985 | Japan . |
| 2192750 | 1/1988 | United Kingdom ............ 360/99.06 |

OTHER PUBLICATIONS

"Information Processing", vol. 26, No. 1, pp. 25-32, Jan. 1985.

Primary Examiner—A. J. Heinz
Assistant Examiner—Jefferson Evans
Attorney, Agent, or Firm—Wenderoth, Lind & Ponack

[57] ABSTRACT

The invention provides an information recording/reproducing apparatus having a device for loading a cartridge internally holding an information recording medium, an opposing member directly facing the information recording medium at least in a recording mode, and a device for transferring the opposing member. When inserting the cartridge into the information recording/reproducing apparatus, the cartridge loading device transfers the cartridge at least in the direction of the thickness of the cartridge, and then the transfer device transfers the opposing member positioned outside an extended space in the direction of the thickness of the cartridge to a position at which the opposing member directly faces the information recording medium inside the extended space in the direction of the thickness of the cartridge.

4 Claims, 4 Drawing Sheets

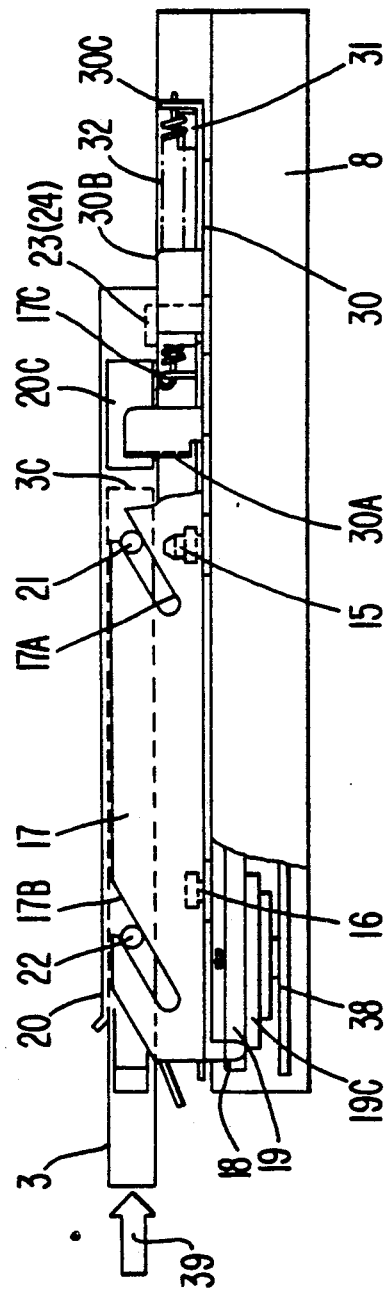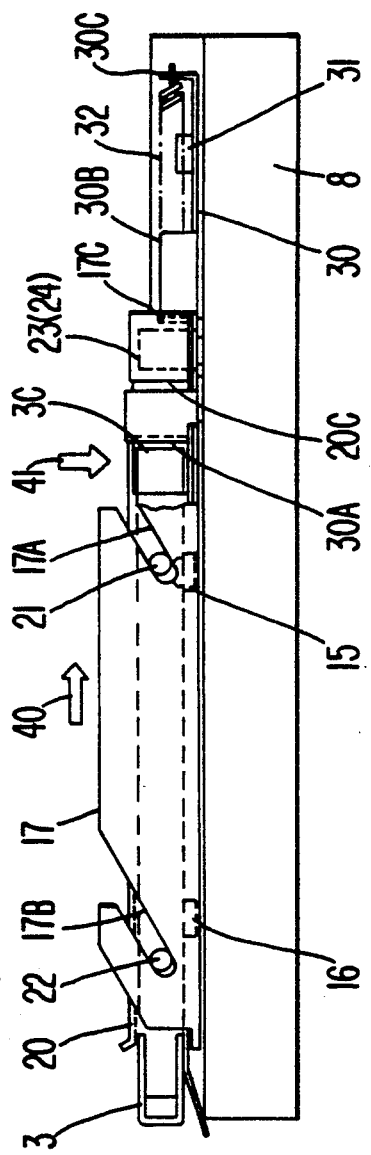

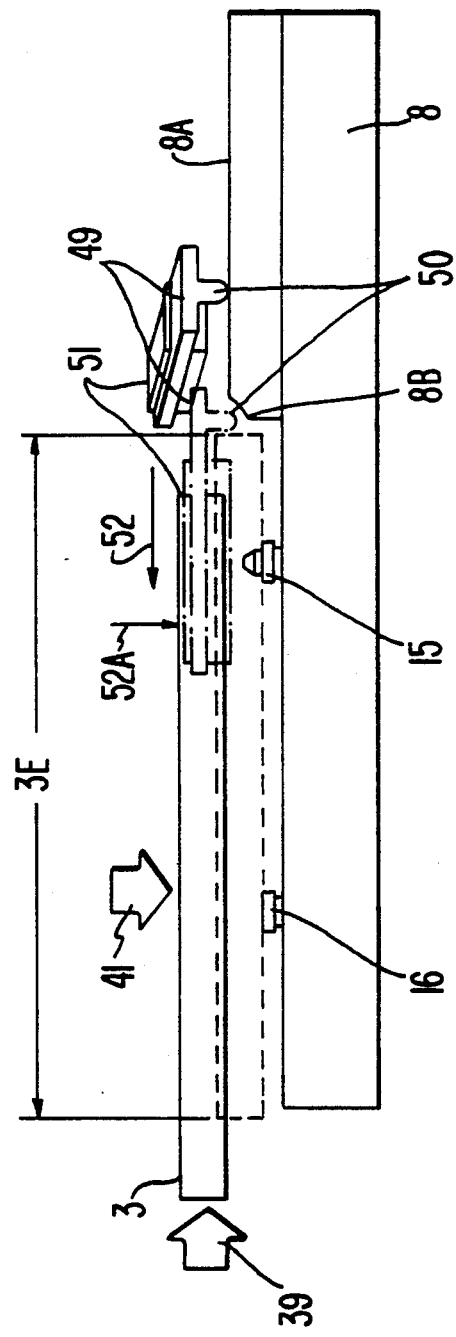

RECORDING AND/OR REPRODUCING APPARATUS INCLUDING A CARTRIDGE LOADING DEVICE this application is a continuation of now abandoned application Ser. No. 07/378,616 filed on Jul. 12, 1989.

BACKGROUND OF THE INVENTION

1. Field of the Invention

The present invention relates to an information recording/reproducing apparatus such as an optical disc driving apparatus or an audio/video tape recorder which uses a cartridge internally holding an information recording medium.

2. Description of the Prior Art

As is represented by the lap-top type computer, when a conventional information recording/reproducing apparatus using a cartridge internally holding an information recording medium is to be built in a compact housing, a critical problem arises in making the structure thin.

Conventionally, an opto-magnetic disc apparatus focuses a light beam on an optical disc (which is substantially the information recording medium) held inside of a cartridge through a window provided in the lower surface of the cartridge in order to generate an easily-magnetizable condition by locally raising the temperature above the curie-point, and then records information by generating a magnetization of the optical disc in correspondence with a magnetic field generated by an electromagnet, or a permanent magnet, or a magnetic head installed in a position facing the optical disc through a window provided in the upper surface of the cartridge opposite to the lower surface of the optical disc.

A mechanism related to the above is illustrated in a Japanese publication "Information Processing", Vol. 26, No. 1, page 27, FIGS. 2 and 3. Reading of the recorded information is executed by detecting an inversion of magnetization caused by the "Car effect", which causes the polarized plane of said beam reflected by the information recording medium to rotate itself in response to the magnetization.

Nevertheless, in order to invert a magnetic field at a very fast speed in a process of forming a sufficient magnetic field by using a coiled electromagnet, it is essential for the system to solve problems of the delayed rise of current and heat generation, and thus, actually, formation of a thin structure cannot easily be achieved. Further, when the magnetic field is inverted by a high speed inversion of a permanent magnet, which has a relatively large size for generating a high density of magnetic flux, a substantial rotation space is needed for the permanent magnet to invert, and thus it is difficult to achieve a thin structure. Furthermore, when transferring the magnetic head at a very fast speed synchronous with the transfer of the optical beam spot, it is essential for a support for the magnetic head to have an extremely rigid structure in order to precisely hold its own resonance and relative position to the optical disc, and thus it is quite difficult to make the support thin to achieve a thin structure.

Regarding an optical disc driving apparatus which is substantially an information recording/reproducing apparatus as well, a method is employed for securing the optical disc to the disc table for rotating the optical disc, in which a disc clamper is set in a position opposite to the disc table across the optical disc and a permanent magnet is provided on either the disc table or the disc clamper, whereas a ferromagnetic substance is provided on the opposite side in order to secure the optical disc to the disc table by applying the mutual attractive force. However, the optical disc must be securely clamped when increasing the signal-transfer rate generated by rotating the optical disc at an extremely fast speed. Since the permanent magnet or ferromagnetic substance needs sufficient thickness, provision of a thin structure for the conventional apparatus is a critical problem.

On the other hand, in order to transfer the electromagnet or the disc clamper facing the optical disc to a predetermined position after loading the cartridge internally holding the optical disc inside of the information recording/reproducing apparatus, a mechanism for implementing interlocking movement is needed for operating the optical disc driving apparatus. For this purpose, a rotary cam device is conventionally used which repeatedly moves those members connected to the cam follower by transferring the cam follower by rotating it along the shape of the cam. To transfer a plurality of cam followers in different directions and/or different distances from each other, a plurality of rotary cams connected to each other via gears are provided, or a plurality of cam-shaped grooves or projections corresponding to the expanded outer diameters of the rotary cams are provided. Although achievement of a compact and thin structure of the rotary cam is required, actually it is very difficult for any conventional information recording/reproducing apparatus to have a compact and thin structure where a plurality of rotary cams or rotary cams having a large outer diameter for transferring a plurality of cam followers are used.

SUMMARY OF THE INVENTION

A primary object of the invention is to achieve a thin structure of an information recording/reproducing apparatus by utilizing members having sufficient thickness and respectively facing an information recording medium at least in a recording mode such as an electromagnet or a disc clamper installed at a position opposite to an optical disc for example.

A second object of the invention is to securely interlink the operations for transferring a cartridge to a predetermined position inside of the information recording/reproducing apparatus and an opposite member like the electromagnet or the disc clamper to a predetermined position with high reliability and, in addition, provide a novel rotary cam capable of securely achieving the high-precision movements mentioned above.

To achieve the primary object, an information recording/reproducing apparatus according to the invention is characteristically provided with: carriage loading means which transfers a cartridge internally holding an information recording medium for insertion into the information recording/reproducing apparatus at least in a direction of the thickness of the cartridge, which is perpendicular to a cartridge inserting direction, before eventually loading the cartridge into a predetermined position inside of the information recording/reproducing apparatus; opposing means which faces the information recording medium at least in a recording mode and is in a position outside of a space extending from the inserted position of the cartridge in the direction of the thickness of the cartridge which is also the direction of the thickness of the optical disc held inside the cartridge when the cartridge is inserted into the apparatus; and transfer means which transfers the opposing means to a predetermined position opposite to the information recording medium placed inside of the extended space in the direction of the thickness of the cartridge after causing the cartridge loading means to move the cartridge in the direction of the thickness of the cartridge before eventually loading it to the predetermined position inside of the information recording/reproducing apparatus.

When inserting the cartridge into the cartridge loading means, the opposing means is initially positioned outside o the extended space extending in the direction of the thickness of the cartridge. Here, the "thickness" of the cartridge is defined, as in the ordinary meaning, as the dimension of the cartridge in the direction of the thickness of the optical disc held inside the cartridge, or as the dimension of the cartridge in the direction perpendicular to the recording layer of the optical disc held inside the cartridge After the cartridge has been transferred at least in the direction of its thickness, the opposing means is transferred to a space above the cartridge. As a result of these movements, the opposing means can be set at a predetermined position after the completion of the transfer of the cartridge in the direction of its thickness without occupying additional space in the direction of the thickness of the cartridge. This provides the information recording/reproducing apparatus with the possibility of being made in a thin configuration.

A rotary cam device according to the second object of the invention for securely and most reliably interlinking the cartridge loading means for transferring the cartridge to the predetermined position inside the information recording/reproducing apparatus with the transfer means for transferring the opposing means such as an electromagnet or a disc clamper to the predetermined position is characteristically provided with: a first cam follower which is urged in a direction toward the center of the rotary cam, a first cam surface corresponding to the first cam followers, a second cam follower which is urged in a direction toward the periphery of the rotary cam, and a second cam surface corresponding to the second cam follower and sharing a cam groove with the first cam, where one of the first and second cam followers is connected to the cartridge loading means and the other to the transfer means.

By virtue of the structure described above, two cam followers share the same cam groove and come into contact with the corresponding cam surfaces while these cam followers are urged in opposite directions from each other in the radial direction. This allows these cam followers to share the transfer position in the radial direction without mutual interference. As a result, the rotary cam device can stably drive cams while adequately achieving the equivalent transfer amount in the radial direction.

BRIEF DESCRIPT OF THE DRAWINGS

FIGS. 2 and 3 are respectively schematic side views showing main components of a cartridge loading device for explaining an operation of loading the cartridge at a predetermined position inside the information recording/reproducing apparatus according to the invention;

Figure 4:
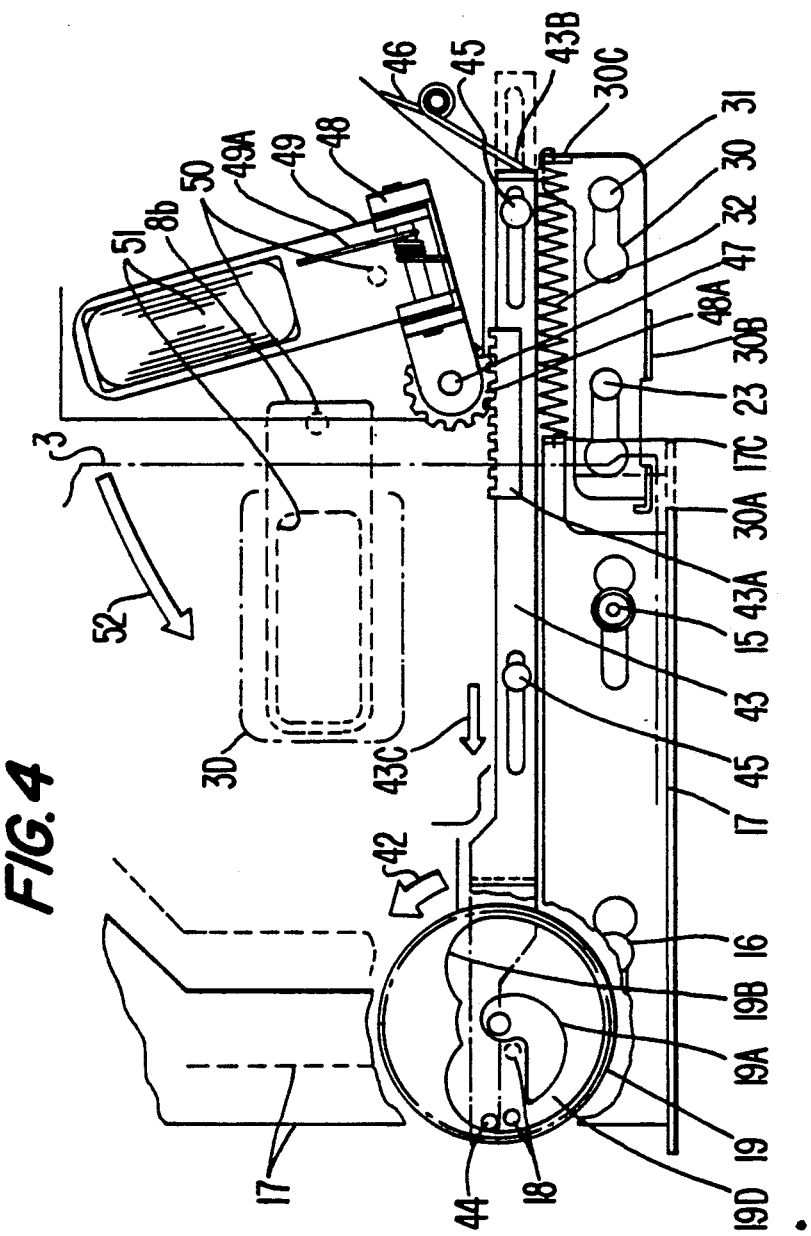

FIG. 4 is a plan view for explaining operations of the sliding cam 17 and the driving lever 43 engaged with the rotary cam; and FIG. 5 is a schematic side view showing a positional relationship between the cartridge 3 loaded inside of the information recording/reproducing apparatus and an electromagnet 51 which is substantially the opposing means.

DESCRIPTION OF THE PREFERRED EMBODIMENTS

To achieve the above objects, referring now more particularly to FIGS. 1-5, concrete embodiments of a mechanism of an optical disc driving apparatus constituting the information recording/reproducing apparatus of the invention are described below.

Figure 1:
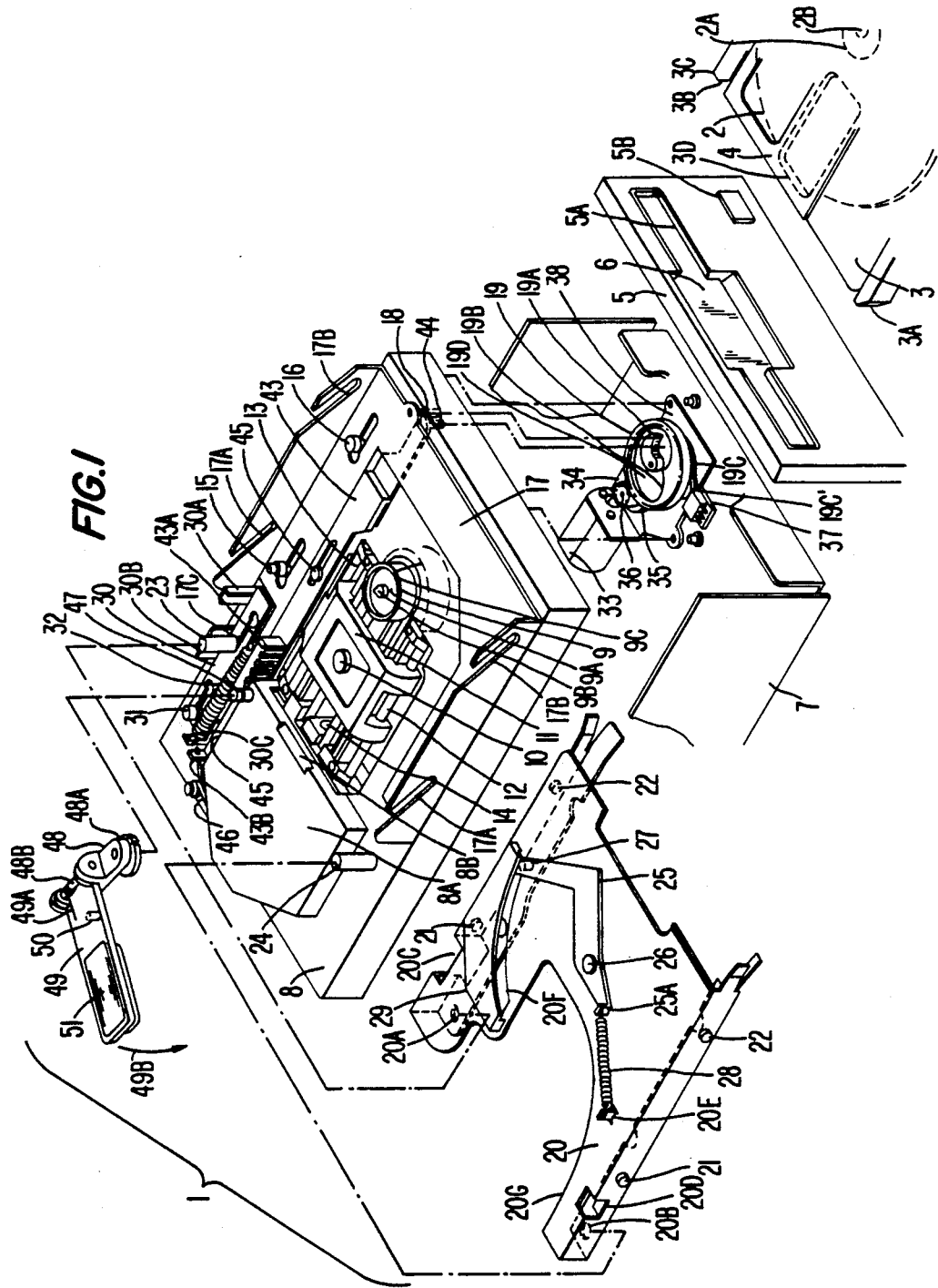
FIG. 1 is a perspective exploded view showing main component parts of an internal mechanism of an information recording/reproducing apparatus according to the invention.

An optical disc driving apparatus 1 shown in FIG. 1 is fully covered by a front panel 5 and an external housing case 7. The front panel 5 has an aperture 5A which allows insertion of a cartridge 3 internally holding an optical disc 2 which is substantially an information recording medium, a rotary lid 6 which is rotated by the insertion of the cartridge 3, and an eject button 5B of an electric switch (not shown) on the back of panel 5 for transmitting a cartridge eject signal to the optical disc driving apparatus 1 so that the cartridge 3 can be ejected from the apparatus 1.

The cartridge 3 has windows 3D on its upper and lower surfaces. The bottom window 3D (not visible) is in a position at which the optical disc 2 directly faces a lens 10 therethrough when the cartridge 3 is internally secured in the optical disc driving apparatus 1. The top window 3D is in a position at which the optical disc 2 faces therethrough an electromagnet 51 which is substantially an opposing member. When the cartridge 3 is out of the apparatus, the top and bottom windows 3D are closed by sliding shutters 4. An inclined portion 3A at the front end of one of the side surfaces of the cartridge 3 is provided in order that the inclined portion 3A can correspond to a projection 20D which has an inclined side surface and is provided on a cartridge holder 20 within the housing and internally holding the cartridge 3. If the cartridge 3 is inserted into the optical disc driving apparatus 1 in a direction different from the correct direction, the inclined portion 3A inhibits the entry of the cartridge 3 to the proper depth. A contact portion 3C at the front end of the other side surface of the cartridge 3 comes into contact with a contact member 30A of a holder lock 30 (described later) when the cartridge 3 is inserted in the correct direction. A concavity 3B is provided between the cartridge contact portion 3C and the sliding shutter 4 for allowing insertion of an opener pin 27 (described later) for opening the sliding shutter 4. When the cartridge 3 is fully inserted into apparatus 1, the optical disc 2 is mounted on a disc table 9 provided on a chassis 8 which is installed inside the apparatus 1 and integrated with the external housing 7 directly or via a damper (not shown) for buffering oscillation from any external source outside the apparatus 1. The disc table 9 for rotating the optical disc 2 by a disc motor 9C is internally provided with a permanent magnet 9A and a center shaft 9B.

A ferromagnetic disc 2A made of an iron plate having a center hole 2B is provided at the center of the optical disc 2. When loading the optical disc 2 on the disc table 9, the center shaft 9B is engaged with the center hole 2B and, due to the presence of an attractive force between the permanent magnet 9A and the ferromagnetic disc 2A, the optical disc 2 is securely fixed to the disc table 9 with the rotation axis thereof coinciding with the axis of the disc table 9.

An actuator 11 for the lens 10 is guided by a pair of guide shafts 12 and 13 provided on the chassis 8 so that the actuator 11 can be transferred in a radial direction of the disc table 9. Those known optical components of an optical disc driving apparatus such as a semiconductor laser, collimation lens, and focus-tracing error detectors, for example, are disposed inside a housing 8A and are not shown in order to simplify the drawing. Beams from a light path aperture 14 are refracted by a reflection mirror (not shown) inside the actuator 11 before being focused on the optical disc 2 via the lens 10.

In order to securely engage the optical disc 2 held inside the cartridge 3 with the disc table 9, a pair of positioning pins 15 and a pair of height-positioning pins 16 are respectively provided on the surface of the chassis 8, and these pins guide the movement of a sliding cam 17 so as to keep the cam in a predetermined range. Pairs of inclined cam members 17A and 17B are provided on both sides of the sliding cam 17, which are respectively engaged with a pair of engaging pins 21 and 22 fixed to both side surfaces of a cartridge holder 20. The cartridge holder 20 has a pair of positioning holes 20A and 20B, respectively, slidable on holder guide shafts 23 and 24 which project upwardly from the chassis 8. When the sliding cam 17 moves in the direction of arrow 40 shown in FIG. 3, the movement of the cartridge holder 20 in the direction of arrow 40 is restricted. Nevertheless, the cartridge holder 20 descends, owing to the function of the inclined cam members 17A and 17B of the sliding cam 17, in the direction of arrow 41 shown in FIG. 3 (corresponding to the direction of the thickness of the cartridge 3 to be inserted). When the sliding cam 17 moves in the opposite direction, the cartridge holder 20 ascends.

An opener arm 25 is provided on the cartridge holder 20, and is rotatably supported by a shaft 26 and provided with an erect opener pin 27 at the free end thereof. The other end 25A of the opener arm 25 is connected to an end of an opener spring 28 which is fixed at the other end to a projection 20E on the cartridge holder 20 and, as a result, the opener arm 25 is urged by the opener spring 28 in a direction opposite to the insertion direction of the cartridge 3. The rotational position of the opener arm 25 is restricted by the opener pin moving in an elongated hole 20F of the cartridge holder 20 in order that the opener pin 27 can match a position at which the opener pin 27 enters into the concavity 3B of the cartridge 3 as the cartridge is inserted. To prevent the opener arm 25 from ascending while rotating, an opener guide 29 is provided alongside the opener pin 27. A round-shaped cutout portion 20G is provided in the cartridge holder 20 to form a path for pivotable movement of an electromagnet 51 which is opposed to the optical disc 2.

A holder lock 30 is also provided on the chassis 8 and slidably guided on the chassis 8 by holder guide shaft 23 and holder lock guide shaft 31 on the chassis 8. The holder lock 30 is substantially a locking member for the cartridge holder 20. As shown in FIG. 2, the holder lock 30 is provided with a control member 30B for restricting the vertical position of the cartridge holder 20 by normally abutting against the bottom surface of the cartridge holder 20. In addition, the holder lock 30 is provided with a control member 30A which is contacted by contact portion 3C of the cartridge 3 inside the cartridge holder 20. As shown in FIGS. 2 and 3, the contact member 30A is positioned inside contact portion 20C of the cartridge holder 20. A tension spring 32 is connected under tension between an engaging end 30C of the holder lock 30 and an engaging pin 17C on the sliding cam 17. When the cartridge contact portion 3C of the inserted cartridge 3 abuts the contact member 30A of the holder lock 30, the holder lock 30 moves rearwardly and the spring 32 generates an urging force in a direction to resist the insertion of the cartridge 3, and simultaneously, it also provides the sliding cam 17 with an urging force in the direction of arrow 40 shown in FIG. 3. The spring 32 generates sufficient urging force that the cartridge 3 descends in the direction of its thickness after being inserted through the aperture 5A into the cartridge holder 20 coupled to the sliding cam 17. The lower position of the cartridge 3 is defined by the control member 30B of the holder lock 30. The control member 30B also defines the position of the sliding cam 17. The holder guide shaft 23 and the holder lock guide shaft 31 jointly define the position of the holder lock 30 caused by the urging force of the tension spring 32.

A rack lever 43 having a rack 43A is provided on the chassis 8 and the rack lever 43 is freely slidably guided by upright guide shafts 45 on the chassis 8. The rack lever 43 is urged at one end 43B in the direction of arrow 43C shown in FIG. 4 by a torsion coil spring 46. The rack 43A is geared with a pinion 48A of a rotary holder 48 which is rotatably supported by an upright shaft 47 on the projecting housing 8A of the chassis 8. The rotary holder 48 has a shaft 48B and supports on the shaft 48b a magnet holder 49 supporting the electromagnet 51. As shown in FIG. 1, the magnet holder 49 is urged in the direction of arrow 49B by a coil spring 49A supported by the shaft 48B. As shown in FIG. 5, when the magnet holder 49 is in a position outside the extended space 3E, as shown in solid lines, the rotational position of the magnet holder 49 in the direction of narrow 49B is restricted by the abutment of an upright abutting pin 50 on the bottom surface of the magnet holder 49 against the housing 8A of the chassis 8. A bevel portion 8B is provided on a part of the housing 8A in order that the magnet holder 49 can smoothly rotate, both horizontally and vertically, through a position where the abutting pin 50 is in contact with the bevel portion 8B, forward to and backward from a position opposed to the optical disc 2 by the movement of the rack lever 43. The magnet holder 49 at the position opposed to the optical disc 2 has further rotated in the direction of arrow 49B to the position, shown in broken lines, where the rotational position of the magnet holder 49 in the same direction is restricted by the abutment of the bottom surface of the magnet holder 49 against the rotary holder 48.

As shown in FIG. 1, a motor 33 is secured to the back surface of chassis 8 by a fixing member 38. A worm 34 integral with the motor 33 is engaged with a worm wheel 35 which is rotatably supported on the fixing member 38. The rotating force of the motor 33 is transmitted to a rotory cam 19 axially rotatably supported on the fixing member 38 via a pinion 36 which is integral with the worm wheel 35 and engaged with a ring gear on the external circumference of the rotary cam 19.

A cam groove 19D has on the inner side a first cam surface 19A of the rotary cam 19 disposed at a position engageable with a first cam follower 18 mounted on the slide cam 17 and on the outer side a second cam surface 19B disposed at a position engageable with a second cam follower 44 mounted on the rack lever 43. The tension spring 32 urges the first cam follower 18 in the direction inwardly toward the center of the rotary cam 19. The torsion coil spring 46 urges the second cam follower 44 in the direction outwardly toward the circumference of the rotary cam 19. When the rotary cam 19 is turned in the direction of arrow 42 shown in FIG. 4, the first and second cam followers 18 and 44 respectively come into contact with only the inner or first cam surface 19A and the outer second cam surface 19B, and move along the corresponding cam surfaces so that they can respectively transfer the slide cam 17 and the rack lever 43 without interfering with each other while simultaneously sharing the movement position in the radial direction of the rotary cam 19.

As shown in FIG. 1, the rotary cam 19 has a rotation position detector 19C which is provided with a projection 19C' having a different radius of rotation. A switch 37 shown in FIG. 1 detects the angle of rotation of the rotary cam 19 by detecting the position of the projection 19C'.

When inserting the cartridge 3, as shown in FIG. 4, the relationship between the positions of first cam follower 18 and the first cam surface 19A of the rotary cam 19 does not obstruct the joint movement of the sliding cam 17 and the first cam follower 18 to a position shown by the broken line. As shown in FIG. 4, the second cam follower 44 remains in contact with the second cam surface 19B of the rotary cam 19. This causes the electromagnet 51 normally to be disposed at a second position shown by a solid line outside of the extended space (schematically shown as a range 3E in FIG. 5) in which the loaded cartridge 3 moves in the direction of its thickness, and to move to and return from a first position shown by a two-dot chain line where it is opposed to a disc. The extended space has a cross-sectional shape corresponding to the shape of the cartridge in a direction parallel to the thickness. The second position is substantially aligned with the path along which the cartridge loading means transfers the cartridge as it passes through the aperture 5A (see FIG. 5).

Next, the operation of the optical disc driving apparatus featuring the above structure will be described.

Referring to FIG. 1, first, when the cartridge 3 is inserted into the cartridge holder 20 through the aperture 5A of the front panel 5 of the optical disc driving apparatus 1 past the rotary lid 6, the opener pin 27 enters into the concavity 3B of the cartridge 3. As the cartridge inserting operation proceeds, the opener arm 25 rotates to move the sliding shutters 4 of the cartridge 3, so that the windows 3D of the cartridge 3 are opened to expose the internal optical disc 2 to the lens 10 and the electromagnet 51.

When the cartridge 3 in inserted further in the direction of arrow 39 (the correct direction for inserting the cartridge 3), as shown in FIG. 2, the contact portion 3C of the cartridge 3 comes into contact with the abutting member 30A of the holder lock 30, so that the holder lock 30 moves against the force of the tension spring 32. In the meantime, the sliding cam 17 is urged by the tension spring 32 in the direction of arrow 39 so as to urge the cartridge holder 20 to lower its position in the direction of the thickness of the cartridge 3. However, the position of the cartridge holder 20 is constrained by the control member 30B of the holder lock 30.

As the cartridge 3 enters further into the cartridge holder 20, the control member 30B releases the constraint on the height position of the cartridge holder 20, and then, as shown in FIG. 3, the sliding cam 17 is transferred by the urging force of the tension spring 32 in the direction of arrow 40 so that the cartridge 3 is moved in the direction of arrow 41 together with the cartridge holder 20, i.e. in the direction of the thickness of the cartridge 3 perpendicular to the direction of arrow 39 in which the cartridge 3 is inserted.

The cartridge 3 is set to a predetermined position on the chassis 8 by means of the positioning pins 15 and the height positioning pins 16.

Simultaneously, the center hole 2B of the optical disc 2 held inside the cartridge 3 is engaged with the center shaft 9B of the disc table 9 and, simultaneously, the optical disc 2 is fixed on the disc table 9 by the attractive force between the disc 2A and the permanent magnet 9A. On the other hand, the position of the holder lock 30 is determined by the contact of the side surface of the control member 30B with the cartridge holder 20. Simultaneously, the contact between the control member 30B and the contact portion 3C of the cartridge 3 is released and, as a result, the position of the cartridge 3 is determined by the positioning pins 15. This positioning is obtained by arranging that the restriction operation of the control member 30B against the cartridge holder 20 can be terminated at a position slightly past, in the direction of the insertion of the cartridge 3, the inserted position of the cartridge. If the cartridge 3 is inserted too far, the control of the inserted position is restricted by, on the one hand, bringing the abutting member 30A of the holder lock 30 into contact with the cutout portion 20C of the cartridge holder 20, the moving direction of which is restricted by the pair of holder guide shafts 23 and 24 fixed to the chassis and, on the other hand, bringing the inclined portion 3A of the cartridge 3 into contact with the projection 20D of the cartridge holder 20 (see FIG. 1).

When the cartridge loading operation is completed, as shown in FIG. 4, the first cam follower 18 on the sliding cam 17 has smoothly moved to a position shown by the broken line in the cam groove 19D without being interfered with by the cam surface 19A of the rotary cam 19. The second cam follower 44 on the rack lever 43 is urged against the second cam surface 19B of the rotary cam 19 by the torsion coil spring 46. While the cartridge loading operation mentioned above is underway, as shown in FIG. 5, the electromagnet 51 is positioned outside the extended space (schematically represented by the range 3E is FIG. 5) and spaced upwardly in the direction of the thickness of the loaded cartridge 3 from its operating position shown by the broken line. After completion of the cartridge loading operation, the rotary cam 19 is rotated by 90° in the direction of arrow 42 (see FIG. 4) by the rotation of the motor 33, so that the second cam follower 44 in contact with the cam surface 19B moves in the direction toward the center of the rotary cam 19 against the force of the torsion coil spring 46. When the rack lever 43 is moved by the movement of the second cam follower 44, the rotary holder 48 engaged with the rack 43a through the pinion 48A rotates in the direction of arrow 52.

The magnet holder 49 carrying the electromagnet 51 axially supported by the rotary holder 48 enters into the extended space and moves in the direction of the thickness of the cartridge 3 with its height position being restricted by the contact of the contact pin 50 with the projected housing 8A of chassis 8. As shown in FIG. 5, during horizontal rotation of the rotary holder 49 in the direction of arrow 52, the abutting pin 50 in contact with the projected housing 8A of the chassis 8 slides therealong to the position where it comes in contact with the bevel portion 8B, and then smoothly moves out of contact with the projected housing 8A. This causes the magnet holder 49 to move in the direction of arrow 52A until the magnet holder 49 comes into contact with the rotary holder 48, where the electromagnet 51 reaches a position opposed at a predetermined distance to the optical disc 2 (shown by the broken line) held inside the cartridge 3. After completion of loading the cartridge 3, the disc table 9 is rotated together with the optical disc 2, and the known operation for recording and/or reproducing information is executed by projecting a laser beam onto the optical disc 2 through the lens 10.

Next, the operation for unloading the cartridge 3 will be described. First, when an operator depresses the eject button 5B on the front panel 5 shown in FIG. 1, the switch behind the eject button 5B is also depressed to generate a command signal for unloading the cartridge 3. On receipt of this command signal, the known system controller (not shown) incorporating a conventional CPU checks that the optical disc 2 has stopped rotation and then rotates the motor 33 so that the rotary cam 19 will rotate in the direction of arrow 42. During the first 90° rotation (i.e., 180° from the state before the cartridge 3 is loaded in the optical disc driving apparatus 1) of the rotary cam 19, the first cam surface 19A does not substantially move the first cam follower 18, whereas the second cam follower 44 moves in the direction toward the circumference of the rotary cam 19 along the second cam surface 19B. As a result of the movement of the rack lever 43 caused by the transfer of the second cam follower 44, the electromagnet 51 performs a reverse transfer movement in the opposite direction to that during the loading operation described above.

After completing the transfer of the electromagnet 51 and further rotation of the rotary cam 19, although the second cam follower 44 does not shift its position, the first cam follower 18 on the sliding cam 17, at the position shown by a broken line in FIG. 4, is moved in the direction toward the circumference of the rotary cam 19 by the first cam surface 19A so that the first cam follower 18 moves in the direction opposite to the direction of arrow 20 shown in FIG. 3 against the force of the tension spring 32. As a result, the cartridge holder 20 carrying the cartridge 3 ascends in the direction of its own thickness.

When the height position of the ascended cartridge holder 20 exceeds the height of the control member 30B of the holder lock 30, the urging force of the tension spring 32 moves the holder lock 30 in the direction opposite to the direction of arrow 40 to push the cartridge 3 by the contact member 30A in the ejecting direction.

After completing the operation for externally ejecting the cartridge 3, the system controller stops the rotation of the motor 33 after the rotary cam 9 has rotated to the position shown in FIG. 4.

Stopping rotation of the rotary cam 19 at the position shown in FIG. 4 subsequent to completion of the cartridge ejecting operation and stopping movement of the electromagnet 51 at the rotated position through the rotation of the rotary cam 19 by 90° subsequent to the loading of the cartridge 3 in the predetermined position, are respectively implemented by detecting the suspension of the above movements by the knocking of the detection switch 37 by a plurality of projections 19C' of the rotation detector 19C of the rotary cam 19 before stopping rotation of the motor 33.

The above description of the preferred embodiment of the information recording/reproducing apparatus according to the invention has described only the opto-magnetic system using the optical disc 2 as the information recording medium, in which the electromagnet 51 for generating a magnetic field constitutes the opposing means facing the optical disc 2. However, it is apparent that an ideal mechanism equivalent to the above embodiment can be achieved by using a disc clamper for mounting and fixing the optical disc onto the disc table as the opposing means facing the optical disc. Concretely, a phase-change type optical disc driving apparatus which dispenses with magnetic field generating means facing the optical disc uses an optical disc which does not have the disc 2A composed of ferromagnetic substance, but instead merely has an engaging hole in the center. In this case, in order to stably mount the optical disc onto the disc table for rotation, a disc clamper is set at the position opposite to the disc table by movement across the optical disc, while a permanent magnet is provided on either the disc table or the disc clamper and a ferromagnetic substance is provided on the other so that the optical disc can be fixed to the disc table by means of the mutual attractive force.

To achieve this system, basically, the structural components and functional operations thereof are the same as those in the foregoing preferred embodiment. In other words, the magnet holder 49 and the electromagnet 51 facing the optical disc may be replaced by the disc clamper holder and the disc clamper (neither is shown in the accompanying drawings).

What is claimed is:

1. An information recording/reproducing apparatus, comprising:

cartridge loading means for loading a cartridge having an optical disc contained therein and having a thickness in a direction corresponding to a thickness of the optical disc, into said apparatus to a predetermined position inside of said apparatus by transferring the cartridge first along a first transfer path in a direction perpendicular to the thickness of the cartridge to a predetermined temporary position and then along a second transfer path in a direction corresponding to the thickness of the cartridge;

clamping means for clamping the optical disk to a rotating means for the optical disk and movable between a first position in which said clamping means is opposed to said optical disk when the cartridge is in said predetermined position inside said apparatus and a second position outside of an extended space having a cross-sectional shape corresponding to the peripheral shape of said cartridge and extending from said predetermined position in the direction of the thickness of the cartridge past said predetermined temporary position, said second position extending laterally of said extended space relative to the direction of the thickness of the cartridge and at an opposite side to said first transfer path with respect to said extended space and being substantially aligned with said first transfer path; and transfer means for transferring said clamping means from said second position to said first position after said cartridge loading means has completed a transfer of the cartridge at least in the direction of the thickness of the cartridge to the predetermined position inside said apparatus, said transfer means having:

a first rotary holder rotatable from a first rotation axis which is parallel to the direction of the thickness of the cartridge, a second rotary holder for holding thereon said clamping means, said second rotary holder being mounted on said first rotary holder rotatably about a second rotation axis perpendicular to said first rotation axis, and drive means for driving said first and second rotary holders to cause their respective rotational movements;

whereby the overall thickness of the apparatus can be kept small.

2. An information recording/reproducing apparatus, comprising:

cartridge loading means for loading a cartridge having an optical disc contained therein and having a thickness in a direction corresponding to a thickness of the optical disc, into said apparatus to a predetermined position inside of said apparatus by transferring the cartridge first along a first transfer path in a direction perpendicular to the thickness of the cartridge to a predetermined temporary position and then along a second transfer path in a direction corresponding to the thickness of the cartridge;

magnetic field generating means movable between a first position in which said magnetic field generating means is opposed to said optical disk when the cartridge is in said predetermined position inside said apparatus and a second position outside of an extended space having a cross-sectional shape corresponding to the peripheral shape of said cartridge and extending from said predetermined position in the direction of the thickness of the cartridge past said predetermined temporary position, said second position existing laterally of said extended space relative to the direction of the thickness of the cartridge and at an opposite side to said first transfer path with respect to said extended space and being substantially aligned with said first transfer path; and transfer means for transferring said magnetic field generating means from said second position to said first position after said cartridge loading means has completed a transfer of the cartridge at least in the direction of the thickness of the cartridge to the predetermined position inside said apparatus, said transfer means having:

a first rotary holder rotatable from a first rotation axis which is parallel to the direction of the thickness of the cartridge, a second rotary holder for holding thereon said magnetic field generating means, said second rotary holder being mounted on said first holder rotatably about a second rotation axis perpendicular to said first rotation axis, and drive means for driving said first and second rotary holders to cause their respective rotational movements;

whereby the overall thickness of the apparatus can be kept small.

3. An apparatus as claimed in claim 2 or 1 further comprising rotary cam means for coupling said cartridge loading means with said transfer means.

4. An apparatus as claimed in claim 3 in which said rotary cam means comprises a rotary cam having a cam groove having an inner cam surface and an outer cam surface, a first cam follower urged in a direction toward the center of said rotary cam against said inner cam surface, and a second cam follower urged in a direction toward the circumference of said rotary cam against said outer cam surface, one of said first cam follower and said second cam follower being connected with said cartridge loading means and the other being connected with said transfer means.

* * * * *